United States Patent
Ferrari et al.

(10) Patent No.: US 8,398,850 B2
(45) Date of Patent: Mar. 19, 2013

(54) WATER TREATMENT FEEDER DEVICE AND A WATER TREATMENT FEEDER SYSTEM

(75) Inventors: Sarah Ferrari, Hagerstown, MD (US); John W. Lane, Finksburg, MD (US)

(73) Assignee: Evapco, Inc., Westminster, MD (US)

( * ) Notice: Subject to any disclaimer, the term of this patent is extended or adjusted under 35 U.S.C. 154(b) by 349 days.

(21) Appl. No.: 12/885,291

(22) Filed: Sep. 17, 2010

(65) Prior Publication Data

US 2012/0067793 A1    Mar. 22, 2012

(51) Int. Cl.
*B01D 21/30* (2006.01)
*B01D 24/00* (2006.01)
*E03B 11/00* (2006.01)

(52) U.S. Cl. ............. 210/142; 210/167.11; 210/167.13; 210/189; 210/205; 210/264; 210/282; 210/287; 210/353

(58) Field of Classification Search ............ 210/141, 210/142, 167.11, 167.13, 189, 205, 264, 210/282, 287, 353, 391, 602, 503, 508, 198.1, 210/154, 756; 422/262, 264, 276, 277, 278; 137/268

See application file for complete search history.

(56) References Cited

U.S. PATENT DOCUMENTS

| | | | |
|---|---|---|---|
| 3,474,817 A * | 10/1969 | Bates et al. ............ 137/268 |
| 4,420,463 A | 12/1983 | Pocius et al. |
| 4,444,730 A | 4/1984 | Renders et al. |
| 4,662,387 A | 5/1987 | King, Sr. |
| 4,692,314 A | 9/1987 | Etani |
| 4,858,449 A | 8/1989 | Lehn |
| 4,880,547 A | 11/1989 | Etani |
| 4,964,185 A | 10/1990 | Lehn |
| 5,198,198 A * | 3/1993 | Gladfelter et al. ............ 422/264 |
| 5,217,607 A * | 6/1993 | Dalton et al. ................ 210/143 |
| 5,427,694 A | 6/1995 | Rugg |
| 5,468,377 A | 11/1995 | Clavin et al. |
| 5,569,374 A * | 10/1996 | Williams ...................... 210/136 |
| 5,810,043 A | 9/1998 | Grenier |
| 5,947,596 A | 9/1999 | Dowd |
| 6,138,703 A | 10/2000 | Ferguson et al. |
| 6,228,273 B1 | 5/2001 | Hammonds |
| 6,337,024 B1 | 1/2002 | Hammonds |
| 6,387,251 B1 | 5/2002 | Marsiglietti et al. |
| 6,418,958 B1 | 7/2002 | Rossi et al. |

(Continued)

OTHER PUBLICATIONS

International Search Report and the Written Opinion of the International Searching Authority, or the Declaration issued on Jan. 5, 2012 for International Application No. PCT/ US11/47083.

*Primary Examiner* — Joseph Drodge
*Assistant Examiner* — Richard Gurtowski
(74) *Attorney, Agent, or Firm* — Rader, Fishman & Grauer PLLC

(57) ABSTRACT

A package of water treatment pellets includes a first container and a second container. The first container is fabricated from a water-dissolvable sheet material and the first container is filled with and encases the water treatment pellets. The second container is fabricated from a non-water-dissolvable, porous material and is sized and adapted to receive the first container filled with and encasing the water treatment pellets. A water treatment feeder device includes a hollow, box-shaped magazine body defining an internal magazine chamber and a plurality of porous holders disposed in the internal magazine chamber. Each one of the plurality of porous holders retains a respective one of the packages of water treatment pellets. A water treatment feeder system for a structure operative to circulate water thereabout incorporates the water treatment feeder device and the package of water treatment pellets.

10 Claims, 12 Drawing Sheets

U.S. PATENT DOCUMENTS

| | | |
|---|---|---|
| 6,451,271 B1 | 9/2002 | Hammonds |
| 6,517,727 B2 | 2/2003 | Pickens et al. |
| 6,531,056 B2 | 3/2003 | Hammonds |
| 6,544,414 B2 | 4/2003 | Hammonds |
| 6,544,487 B1 * | 4/2003 | Ferguson et al. ............. 422/261 |
| 6,620,321 B2 * | 9/2003 | Festa et al. ................... 210/602 |
| 6,716,340 B2 * | 4/2004 | Meyer ........................ 210/167.3 |
| 6,797,165 B2 * | 9/2004 | Harrison ....................... 210/232 |
| 6,820,661 B1 | 11/2004 | Heimert |
| 6,915,811 B2 | 7/2005 | Blanchette et al. |
| 7,168,574 B2 * | 1/2007 | King ............................ 210/503 |
| 7,452,122 B2 * | 11/2008 | Lin ............................ 366/167.1 |
| 2003/0205518 A1 * | 11/2003 | VanderKooi et al. ......... 210/315 |
| 2008/0296214 A1 * | 12/2008 | Blanchette ................. 210/198.1 |

* cited by examiner

WATER TREATMENT FEEDER DEVICE AND A WATER TREATMENT FEEDER SYSTEM

FIELD OF THE INVENTION

The present invention relates to a package of water treatment pellets, a water treatment feeder device employing the package of water treatment pellets and a water treatment system.

BACKGROUND OF THE INVENTION

Some commercial office buildings are adorned with water fountains and/or artificial waterfalls. These water fountains and artificial water falls typically re-circulate water to achieve the desired decorative effect. Certain types of industrial equipment also re-circulate water. One such industrial application for re-circulating water is a conventional heat exchanger 110 such as a cooler illustrated in FIG. 1. The heat exchanger 110 re-circulates water W in a water basin 112 via a pump 114 that connects with a downstream conduit 116. The downstream conduit 116 is connected to and between the pump 114 and a manifold 118 having spray nozzles 120. The water W is then sprayed over a coil assembly 122 through the spray nozzles 120. Hot fluid represented by the hot fluid arrow enters into the coil assembly 122, flows therethrough and exits the coil assembly 122 as cooled fluid represented by the cooled fluid arrow. Simultaneously therewith, ambient air represented by the ambient air arrow is drawn through the heat exchanger 110 by a fan 124 disposed on the top of the heat exchanger 110. The fan 124 draws the ambient air into the heat exchanger 110 through a plurality of louvers 126. In turn, the drawn-in ambient air flows over the wetted coil assembly 122 to cool the hot fluid flowing therethrough and then exits the heat exchanger 110 through the fan 124. Much of the sprayed water W that wets the coil assembly 122 rains back into the water basin 112 thereby completing the re-circulation of the water W from the water basin 112.

Often, it is desirable to treat the water that re-circulates in these structures. The water re-circulating through these structures is typically treated by chemicals to inhibit corrosion and scaling, to reduce or eliminate growth of biomass and/or to reduce or eliminate odor. These chemicals might be in solid or liquid form. In the solid form, these chemicals might be provided as blocks, pellets or granules, to name a few. In the pellet form, these pellets are impregnated with the appropriate water treating chemical. Once in contact with the re-circulating water, the water treating chemical leaches from the pellets in a time-release fashion without the pellets themselves being dissolved or otherwise being consumed.

It would be advantageous to provide a water treatment feeder device that can be easily and quickly loaded with chemically-laden water treatment pellets and can be easily and quickly unloaded of spent water treatment pellets. It would be beneficial to provide a water treatment feeder system that can be can be loaded or unloaded while the water re-circulating structure is either operating or not. It would be advantageous to provide a package of water treatment pellets to facilitate the ease and quickness of loading and unloading the water treatment pellets. It would be beneficial if the water treatment feeder device can be drained for loading and unloading while the water re-circulating structure is operating or not. The present invention provides these advantages and benefits.

OBJECTS AND SUMMARY OF THE INVENTION

It is an object of the present invention to provide a water treatment feeder device that can be easily and quickly loaded with chemically-laden water treatment pellets and can be easily and quickly unloaded of spent water treatment pellets.

It is another object of the present invention to provide a water treatment feeder system that can be can be loaded or unloaded while the water re-circulating structure is either operating or not.

It yet another object of the present invention to provide a package of water treatment pellets to facilitate the ease and quickness of loading and unloading the water treatment pellets.

Still further, it is another object of the present invention to provide a water treatment feeder device that can be drained for loading and unloading of the water treatment pellets while the water re-circulating structure is operating or not.

A first embodiment of a package of water treatment pellets of the present invention includes a first container and a second container. The first container is fabricated from a water-dissolvable sheet material and the first container is filled with and encases the water treatment pellets. The second container is fabricated from a non-water-dissolvable, porous material and is sized and adapted to receive the first container filled with and encasing the water treatment pellets.

A second embodiment of a water treatment feeder device of the present invention includes a hollow, box-shaped magazine body and a plurality of porous holders. The hollow, box-shaped magazine body has a front wall, a rear wall facially opposing and disposed apart from the front wall, a pair of side walls disposed apart from one another and connected to and between the front wall and the rear wall, a top wall and a bottom wall facially opposing and disposed apart from the top wall. The top wall and the bottom wall are connected to the front wall, the rear wall and the pair of side walls to define a generally box-shaped internal magazine chamber. The bottom wall has an inlet opening formed therethough, the top wall has an outlet opening formed therethrough and the front wall has a plurality of ports formed therethrough. The plurality of porous holders are disposed in the internal magazine chamber, span between the front wall and the rear wall and are secured therein such that a respective one of the plurality of porous holders corresponds to and generally aligns with a respective one of the plurality of ports in order to receive the packages of water treatment pellets.

A third exemplary embodiment of the present invention is a water treatment feeder system for a structure operative to circulate water thereabout. The structure includes a water basin containing the water at a water level, circulation piping and a pump interposed in the circulation piping for pumping the water from the water basin and circulating the water back to the water basin. The water treatment feeder system includes the water treatment feeder device disposed downstream of the pump and at least one package of water treatment pellets laced with at least one water treatment chemical and disposed in the magazine body in a water-sealed manner and in a selected one of the plurality of porous holders.

When the pump is energized, a portion of the water flowing downstream of the pump is directed to the inlet opening of the magazine body to fill the magazine body with water and thereafter to the outlet opening of the magazine body for the water to flow out of the magazine body so that the water flowing through the magazine body subsequently discharges into the water basin. And, upon contact with the water, the first container dissolves thereby exposing the water treatment pellets to the water in the magazine body through the second container and the selected one of the porous holders, which, in turn, causes the at least one water treatment chemical to leach from the water treatment pellets and infuse the water with the at least one water treatment chemical to produce a chemically-treated water.

These objects and other advantages and benefits of the present invention will be better appreciated in view of the detailed description of the exemplary embodiments of the present invention with reference to the accompanying drawings, in which:

DETAILED DESCRIPTION OF THE EXEMPLARY EMBODIMENTS

Hereinafter, embodiments of the present invention will be described with reference to the attached drawings. The structural components common to those of the prior art and the structural components common to respective embodiments of the present invention will be represented by the same symbols and repeated description thereof will be omitted.

A first exemplary embodiment of a package 10 of water treatment pellets 12 of the present invention is hereinafter particularly described with reference to FIGS. 2-4. The water treatment pellets 12 are conventional water treatment pellets such as Smart Release® pellets marketed by Dober Chemical Corporation of Woodridge, Ill. Dober Chemical Corporation is the owner of the registered trademark, Smart Release®. Such conventional water treatment pellets contain at least one chemical for treatment of water. Such treatment of water includes corrosion inhibitors, scaling inhibitors, mold inhibitors, bacterial inhibitors and other such inhibitors commonly known in the art. Furthermore, it is preferable that the water treatment pellets release the at least one chemical on a time-delay basis as is known in the art and provided by the Smart Release® pellets.

Figure 1:
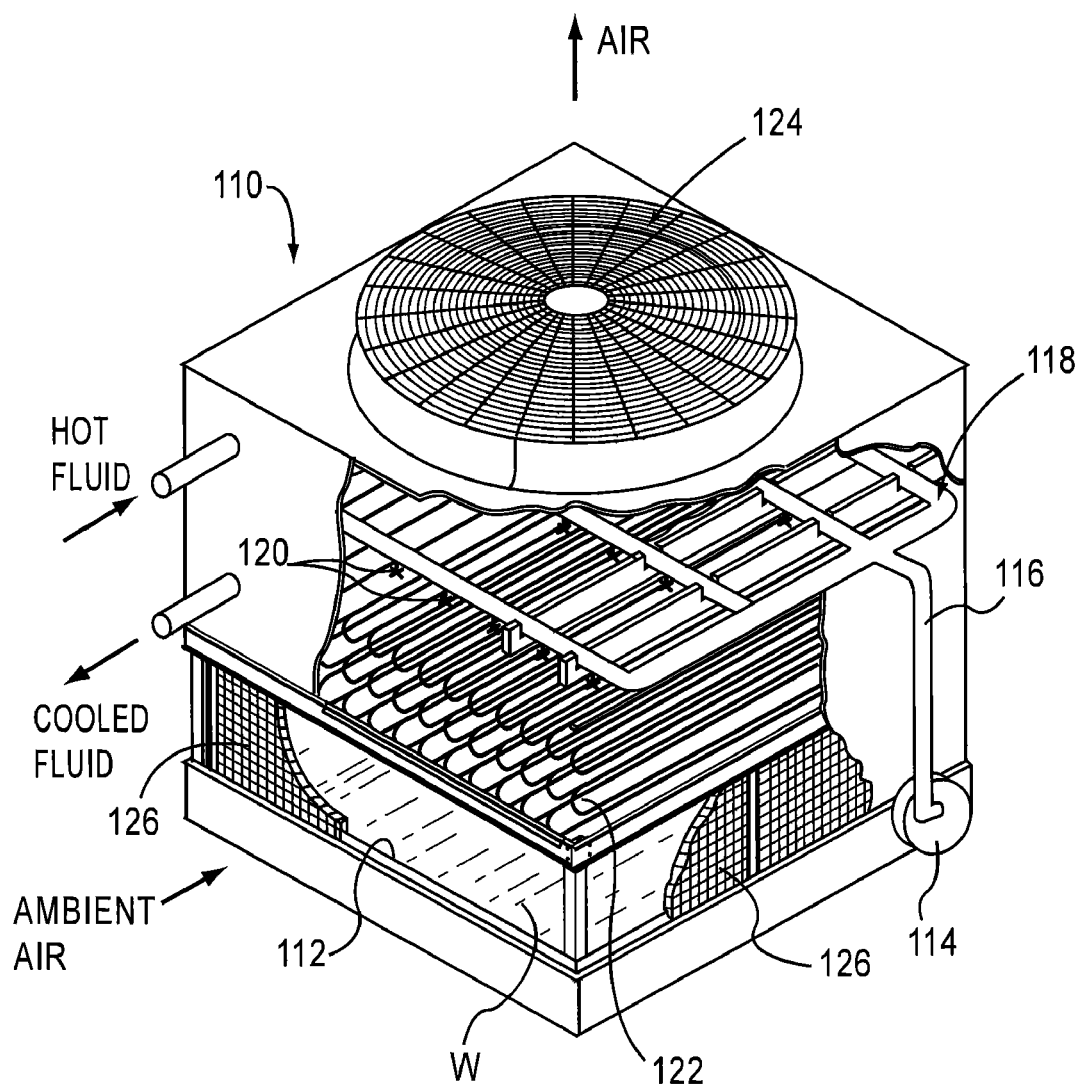
FIG. 1 is a perspective view partially broken away of a conventional water re-circulating structure in a form of a heat exchanger.
Figure 2:
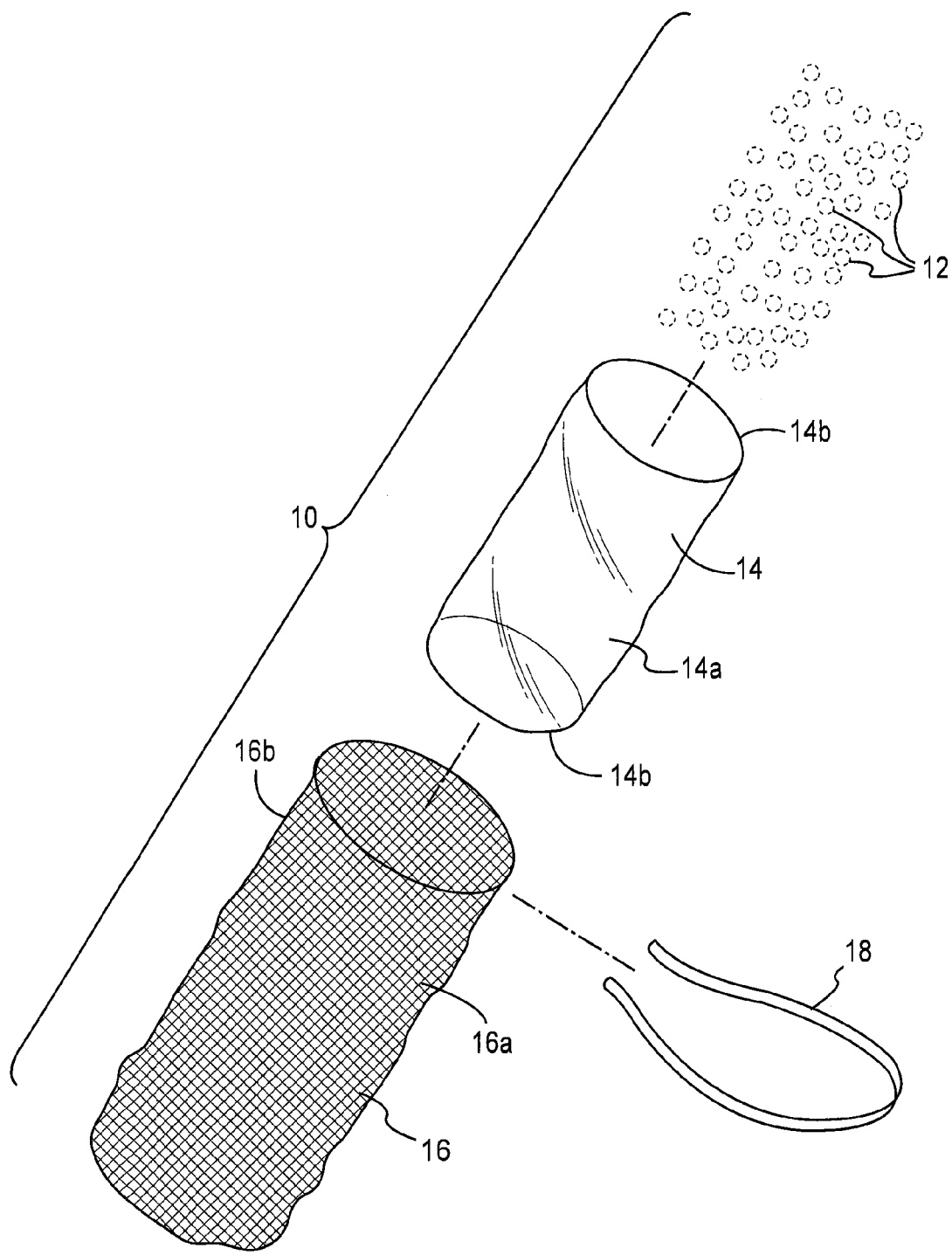
FIG. 2 is an exploded perspective view of a first exemplary embodiment of a package of water treatment pellets of the present invention.
Figure 3:
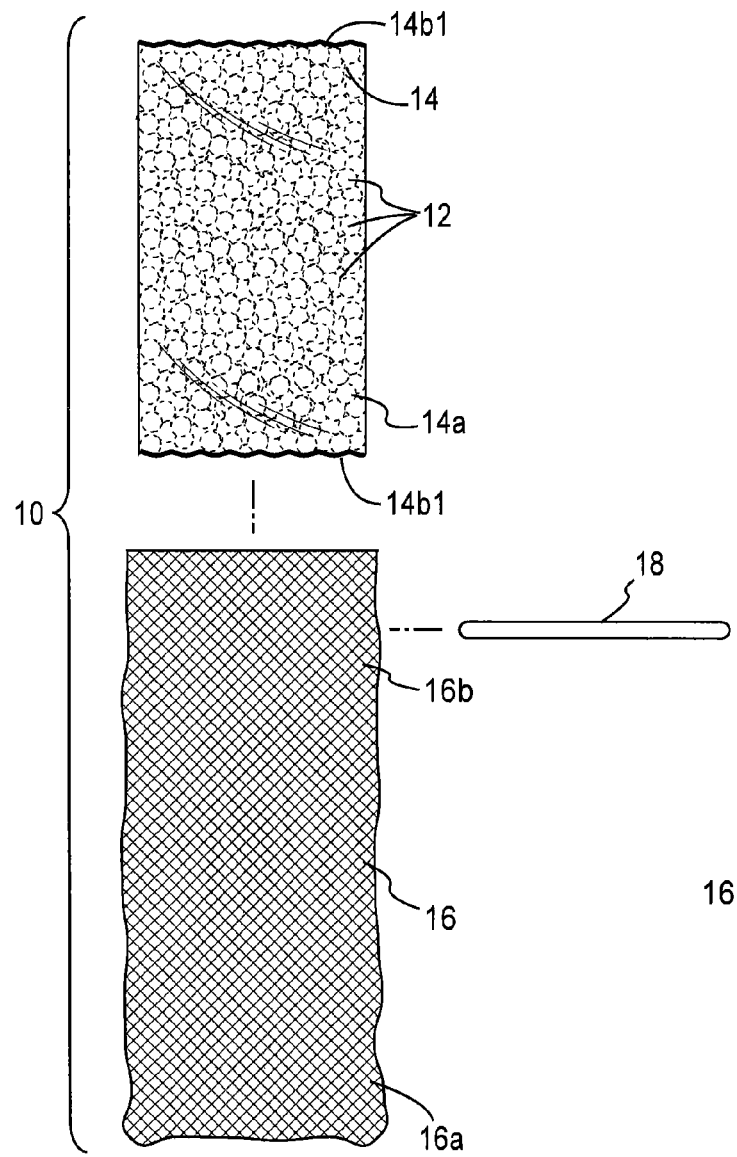
FIG. 3 is a side elevational view of the package of water treatment pellets partially packaged.
Figure 4:
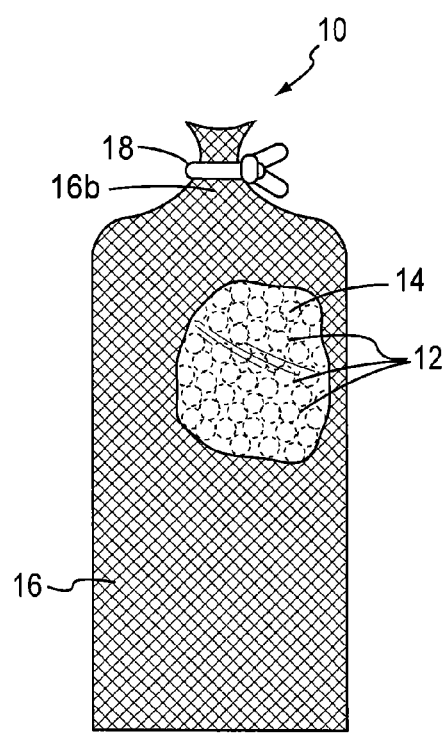
FIG. 4 is a side elevational view of the package of water treatment pellets fully packaged.

In FIGS. 2-4, the package 10 of water treatment pellets 12 includes a first container 14 and a second container 16. The first container 14 is fabricated from a water-dissolvable sheet material 14a such as polyvinyl alcohol. The first container 14 is filled with the water treatment pellets 12 and encases the water treatment pellets 12 therein. The second container 16 is fabricated from a non-water-dissolvable porous material 16a. The second container 16 is sized and adapted to receive the first container 14 filled with and encasing the water treatment pellets 12.

Although not by way of limitation but by example only, the first container 14 is a sleeve of polyvinyl alcohol sheet material. In FIG. 2, the sleeve has opposing opened ends 14b. As shown in FIG. 2, the opened ends 14b are closed to encase the water treatment pellets 12 in the sleeve. By way of example only, the each one of the opened ends 14b are sealed by heat. Thus, when closed, each one of the opened ends 14b, now closed, forms a heat-sealed closed end 14b1. A skilled artisan would appreciate that the opened ends 14b can be closed in other conventional ways such as by adhesive tape without departing from the spirit of the invention.

With reference to FIGS. 2-4, preferably, the non-water-dissolvable porous material 16a is mesh material. It is appreciated by one of ordinary skill in the art that the mesh material has a mesh that is sized to retain the water treatment pellets 12 therein whether the water treatment pellets 12 contain the at least one chemical or the at least one chemical is spent therefrom. Although not by way of limitation but by example only, the non-water-dissolvable porous material 16a is fabricated from either plastic or resin. Alternatively, non-water-dissolvable porous material might be metal such as stainless steel having a plurality of through-holes formed therethrough.

It is, however, preferred, that the mesh material is pliable. More specifically, the second container 16 is formed as a bag of pliable, mesh material. The pliable, mesh-material bag has a bag opened end portion 16b sized to receive the first container 14 filled with and encasing the water treatment pellets 12 so that the pliable, mesh-material bag encloses the first container filled with and encasing the water treatment pellets 12. With the second container 16 formed as a bag and fabricated from a pliable, mesh material, a tie string 18 ties the bag opened end portion 16b as shown in FIG. 4 in order to enclose and retain the first container 14 filled with and encasing the water treatment pellets 12 in the pliable, mesh-material bag.

Figure 5:
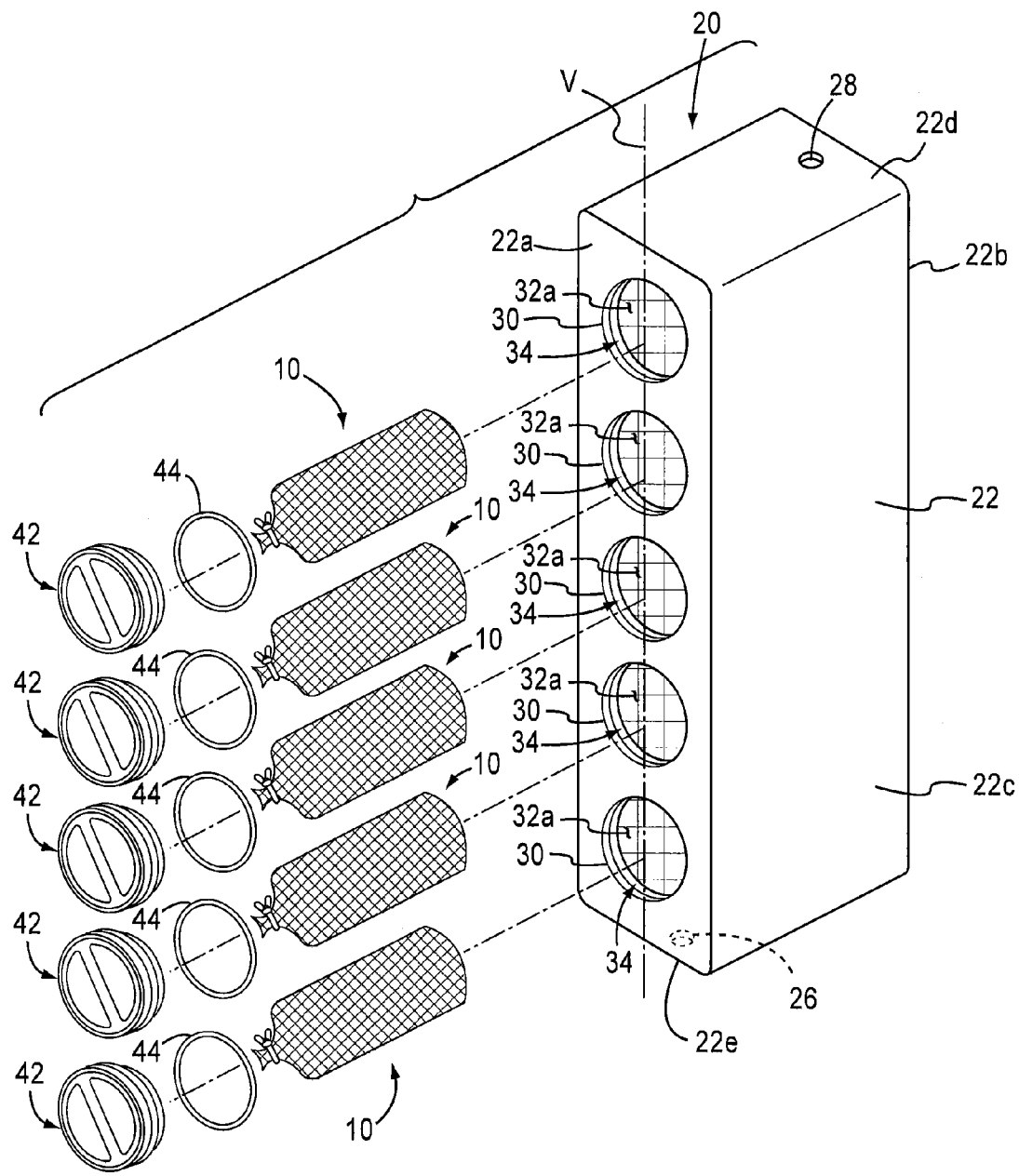
FIG. 5 is a perspective view of a second exemplary embodiment of a water treatment feeder device of the present invention with packages of water treatment pellets aligned therewith.
Figure 6:
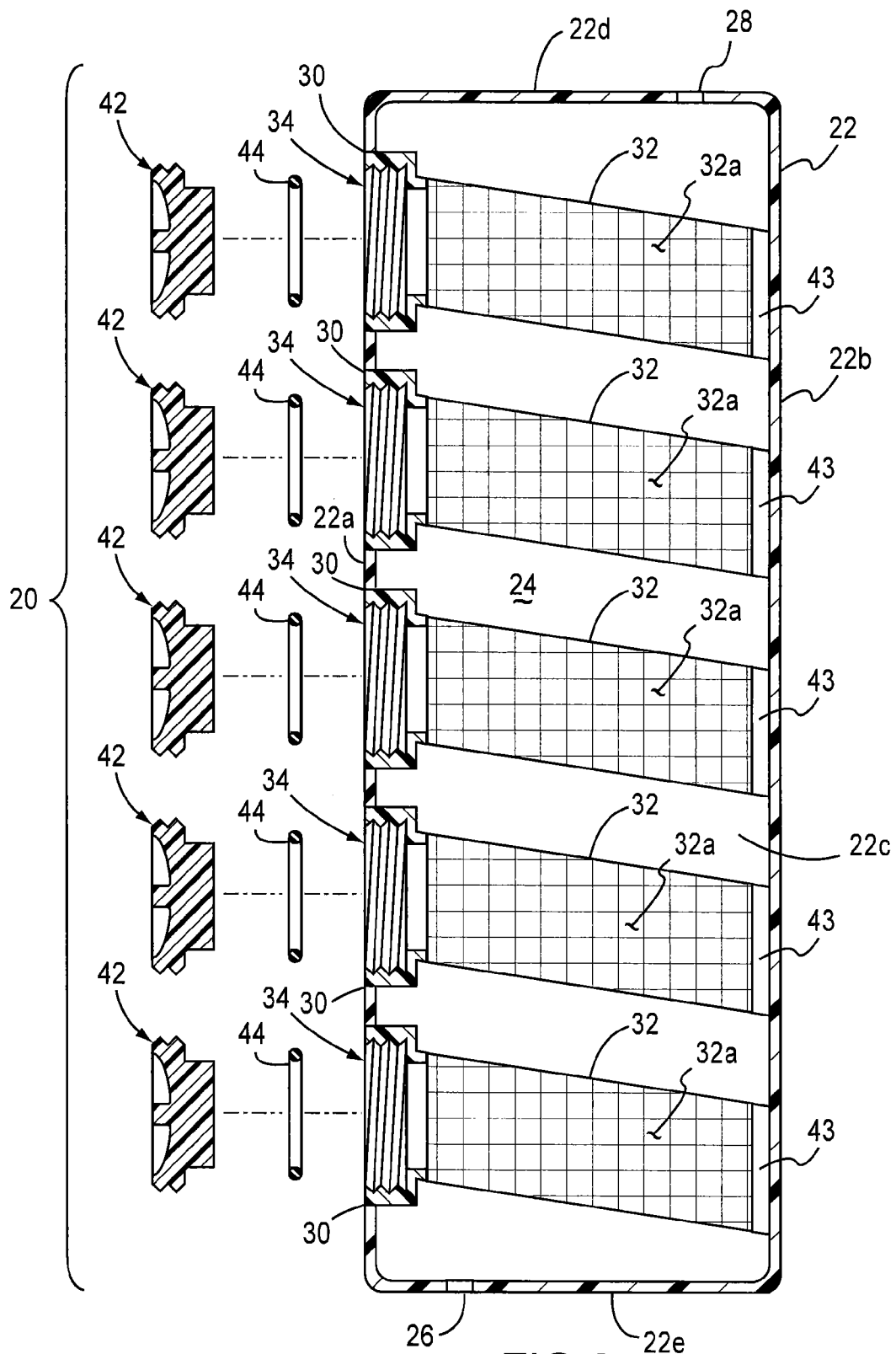
FIG. 6 is a cross-sectional side elevational view of the water treatment feeder device with caps and O-rings disengaged therefrom.
Figure 7:
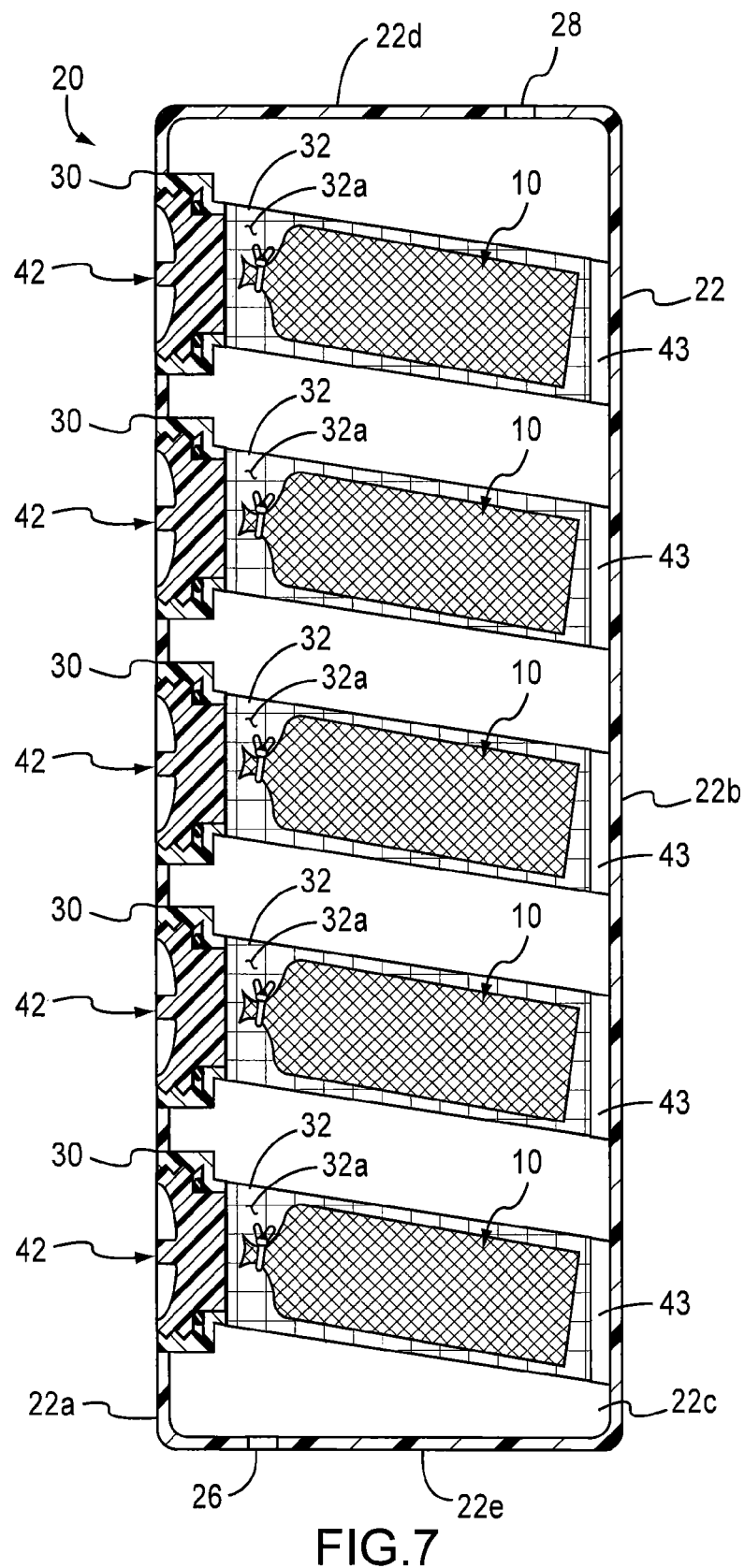
FIG. 7 is a cross-sectional side elevational view of the water treatment feeder device with caps and O-rings releasably engaged therewith and with packages of water treatment pellets being retained therein.

A second exemplary embodiment of a water treatment feeder device 20 of the present invention is introduced in FIGS. 5-11. The water treatment device 20 includes a hollow, box-shaped magazine body 22 and a plurality of porous holders 32. The hollow, box-shaped magazine body 22 has a front wall 22a, a rear wall 22b facially opposing and disposed apart from the front wall 22a, a pair of side walls 22c disposed apart from one another and connected to and between the front wall 22a and the rear wall 22b, a top wall 22d and a bottom wall 22e facially opposing and disposed apart from the top wall 22d. The top wall 22d and the bottom wall 22e are connected to the front wall 22a, the rear wall 22b and the pair of side walls 22c to define a generally box-shaped internal magazine chamber 24 as best shown in FIGS. 6 and 7. In FIGS. 5-7, the bottom wall 22e has an inlet opening 26 formed though the bottom wall 22e and the top wall 22d has an outlet opening 28 formed through the top wall 22d. Again, with reference to FIGS. 5-7, the front wall 22a has a plurality of ports 30 formed through the front wall 22a.

In FIGS. 5-7, the plurality of porous holders 32 are disposed in the internal magazine chamber 24. In FIGS. 6 and 7, the plurality of porous holders 32 span between the front wall 22a and the rear wall 22b and are secured in the internal magazine chamber 24 in any conventional manner in order that each respective one of the plurality of porous holders 32 corresponds to and generally aligns with a respective one of the plurality of ports 30 for reasons set forth below. As best shown in FIG. 5, the plurality of ports 30 are vertically aligned along a vertical axis V, in series and with one on top of the other. By way of example only and not by way of limitation, each one of the plurality of porous holders 32 forms an elongated cage defining an elongated holder chamber 32a therein as best shown in FIG. 5. The cage is fabricated from a lattice material and the lattice material might be resin, plastic or metal. Alternatively, each porous holder 32 might be a cylinder of rigid material such as metal or plastic with through holes formed through the cylindrical surface.

Figure 9:
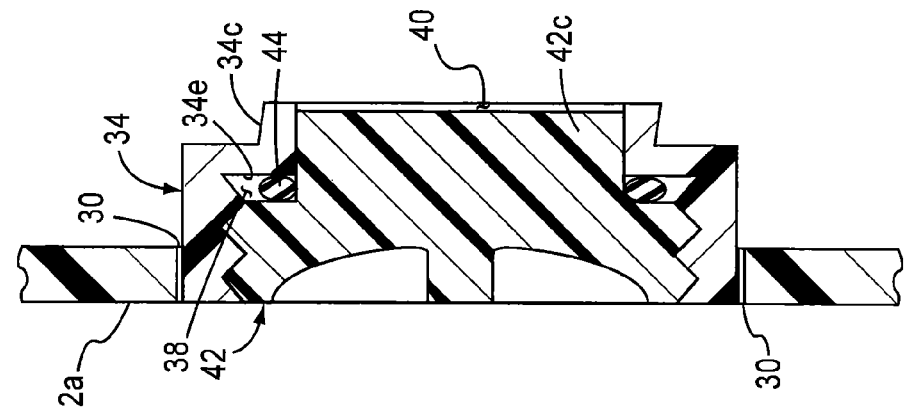
FIG. 9 is an enlarged, cross-sectional view of the cap and the O-ring releasably engaged with the cap-receiving ring member connected to the front wall of the water treatment feeder device.
Figure 8:
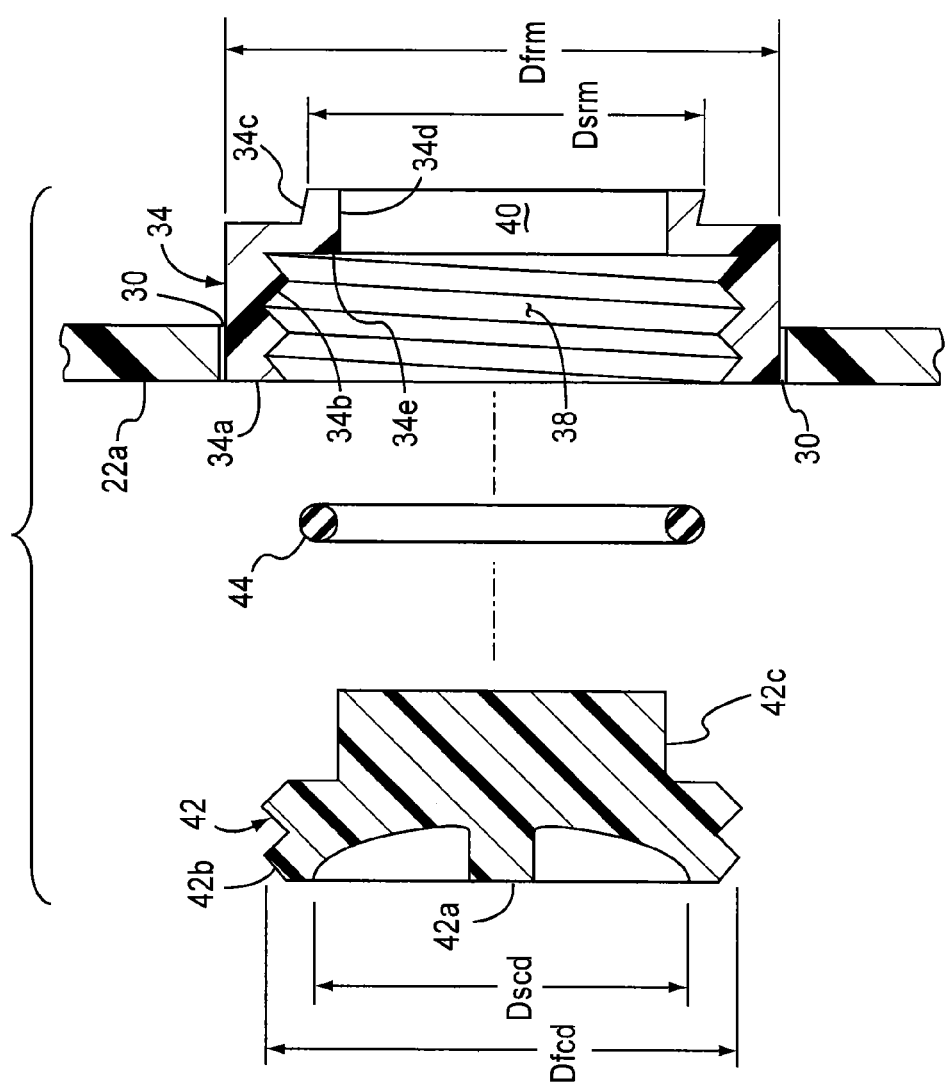
FIG. 8 is an enlarged, cross-sectional view of a cap and an O-ring disengaged from a cap-receiving ring member connected to a front wall of the water treatment feeder device.

As best shown in FIGS. 6-9, the water treatment feeder device 20 also includes a plurality of cap-receiving ring members 34. A respective one of the cap-receiving ring members 34 is inserted into a respective one of the plurality of ports 30. By any conventional manner, the cap-receiving ring members are connected and secured to the front wall 22a. As best shown in FIGS. 8 and 9, each one of the plurality of cap-receiving ring members 34 has a first ring member portion 34a having a first ring member circumferential inner threaded portion 34b defining a first ring member opening 38 extending therethrough and a second ring member portion 34c integrally and concentrically connected to the first ring member portion 34a. The second ring member portion 34c has a second ring member circumferential portion 34d defining a second ring member opening 40. The first ring member opening 38 has a first ring member opening diameter Dfrm and the second ring member opening 40 having a second ring member opening diameter Dsrm smaller than the first ring member opening diameter Dfrm to define a stepped-down ring member radial surface 34e which delineates the first ring member opening 38 and the second ring member opening 40.

Additionally, as illustrated in FIGS. 5-11, the water treatment feeder device 20 includes a plurality of caps 42. As best shown in FIGS. 6-9, respective ones of the plurality of caps 42 are releasably engagable with respective ones of the plurality of cap-receiving ring members 34. As best shown in FIGS. 8 and 9, each cap 42 has a first cap disk 42a that has an outer circumferential threaded surface 42b with a first cap disk diameter Dfcd and a second cap disk 42d integrally and concentrically connected to the first cap disk 42a. The second cap disk 42d has a second cap disk diameter Dscd that is less than the first cap disk diameter Dfcd. Note in FIGS. 7 and 9, the first cap disk 42a and the first ring member portion 34a are threadably engagable with each other and the second cap disk 42c is sized to be received by the second ring member opening 40 when the cap 42 and the cap-receiving ring member 34 are threadably engaged with each other. An O-ring 44 surrounds the second cap disk 42c and is compressed between the first cap disk 42a and the stepped-down ring member radial surface 34e.

Furthermore, in FIGS. 5-7, respective ones of the porous holders 32 and respective ones of the plurality of cap-receiving ring members 34 are arranged relative to each other such that the respective ones of the cap-receiving ring members 34 via the first ring member opening 38 and the second ring member opening 40 provide entry into respective ones of the elongated holder chambers 32a.

Figure 10:
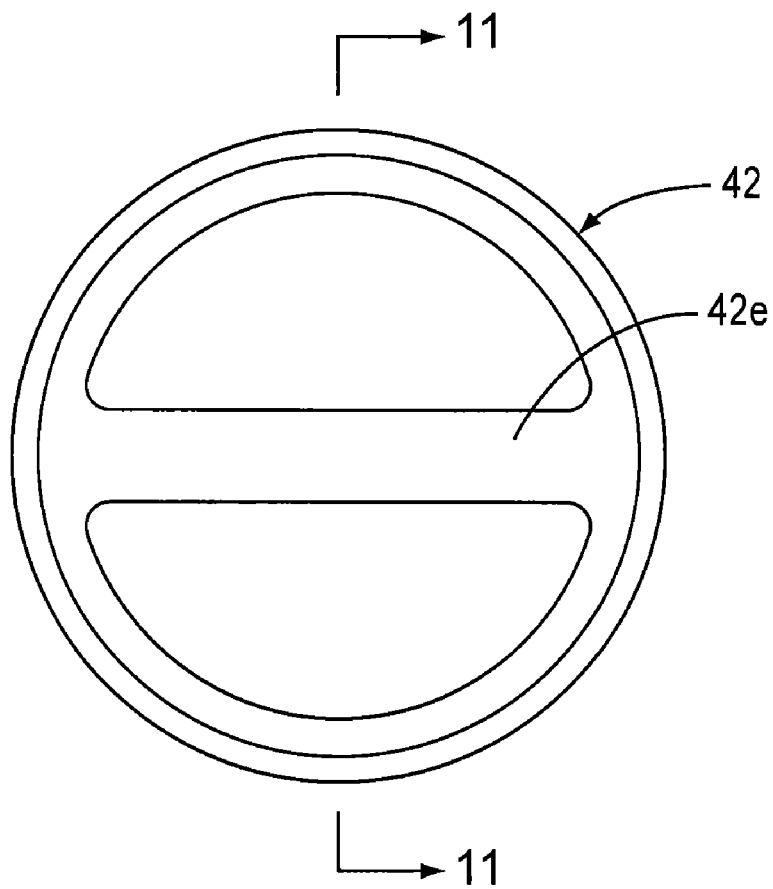
FIG. 10 is a top plan view of the cap.
Figure 11:
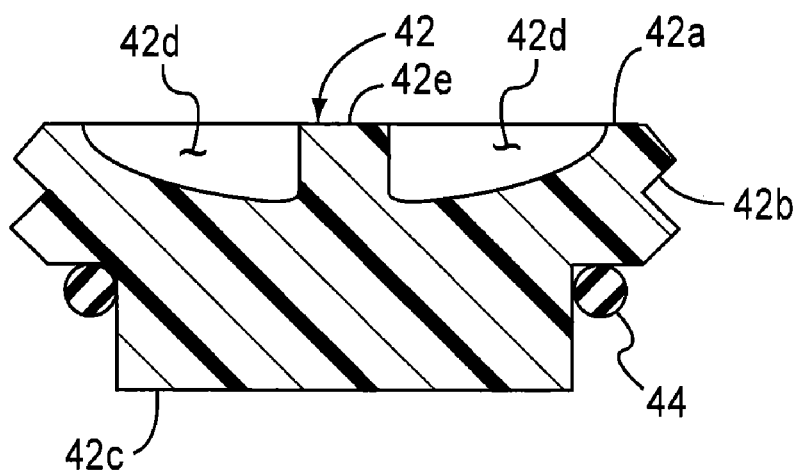
FIG. 11 is a cross-sectional view of the cap taken along line 11-11 in FIG. 10.
Figure 12:
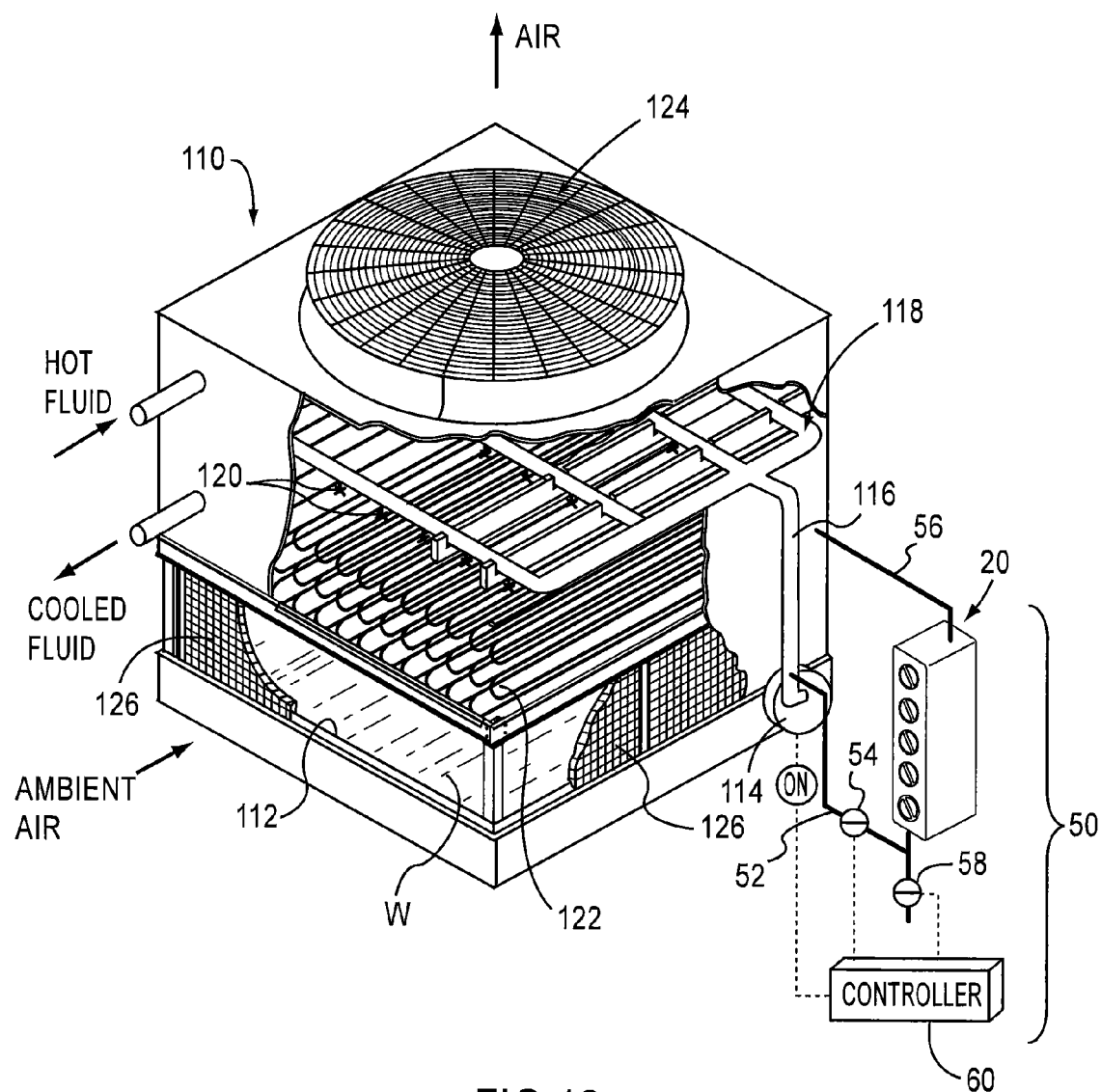
FIG. 12 is a third exemplary embodiment of a water treatment feeder system adapted to the conventional water re-circulating structure in a form of a heat exchanger shown in FIG. 1.

In FIGS. 10 and 11, the cap 42 includes a pair of recess 42d formed into an outer circular surface of the cap 42 to configure a handle 42e. Further, by example only, the plurality of porous holders 32 are securely mounted in the internal magazine chamber 24 on one end by connection to an outer circumferential surface of the second ring member portion 34c while the opposite end is connected to an outer circumferential surface of a mounting disk 43 attached to the rear wall 22b. By way of example only and not by way of limitation, each one of the porous holders 32 is oriented at a downwardly angle as viewed from the cap-receiving ring members 34 as best shown in FIGS. 6 and 7.

One of ordinary skill in the art would appreciate that the sealing of the openings can be performed by a variety of ways besides the threaded cap described. By way of example only and not by way of limitation, other sealing ways would be an end cap with external threads or plugs where rubber gaskets are compressed by a wing nut or cam to form a seal with a smooth pipe surface.

A third exemplary embodiment of a water treatment feeder system 50 of the present invention is introduced in FIGS. 12-15. The water treatment feeder system 50 is for a water-recirculating structure such as the conventional heat exchanger 110 in FIG. 12. The water-recirculating structure is operative to circulate water W thereabout. The structure includes the water basin 112 containing the water W at a water level WL (FIGS. 13-15), the circulation piping 116, the pump 114 interposed in the circulation piping 116 for pumping the water W from the water basin 112 and circulating the water W back to the water basin 112. The water treatment feeder system 50 includes the water treatment feeder device 20 that is disposed downstream of the pump 114 and at least one package 10 of water treatment pellets 12 that are laced with at least one water treatment chemical. The at least one package 10 of water treatment pellets 12 is disposed in the magazine body 22 in a water-sealed manner and in a selected one of the plurality of porous holders 32.

Figure 13:
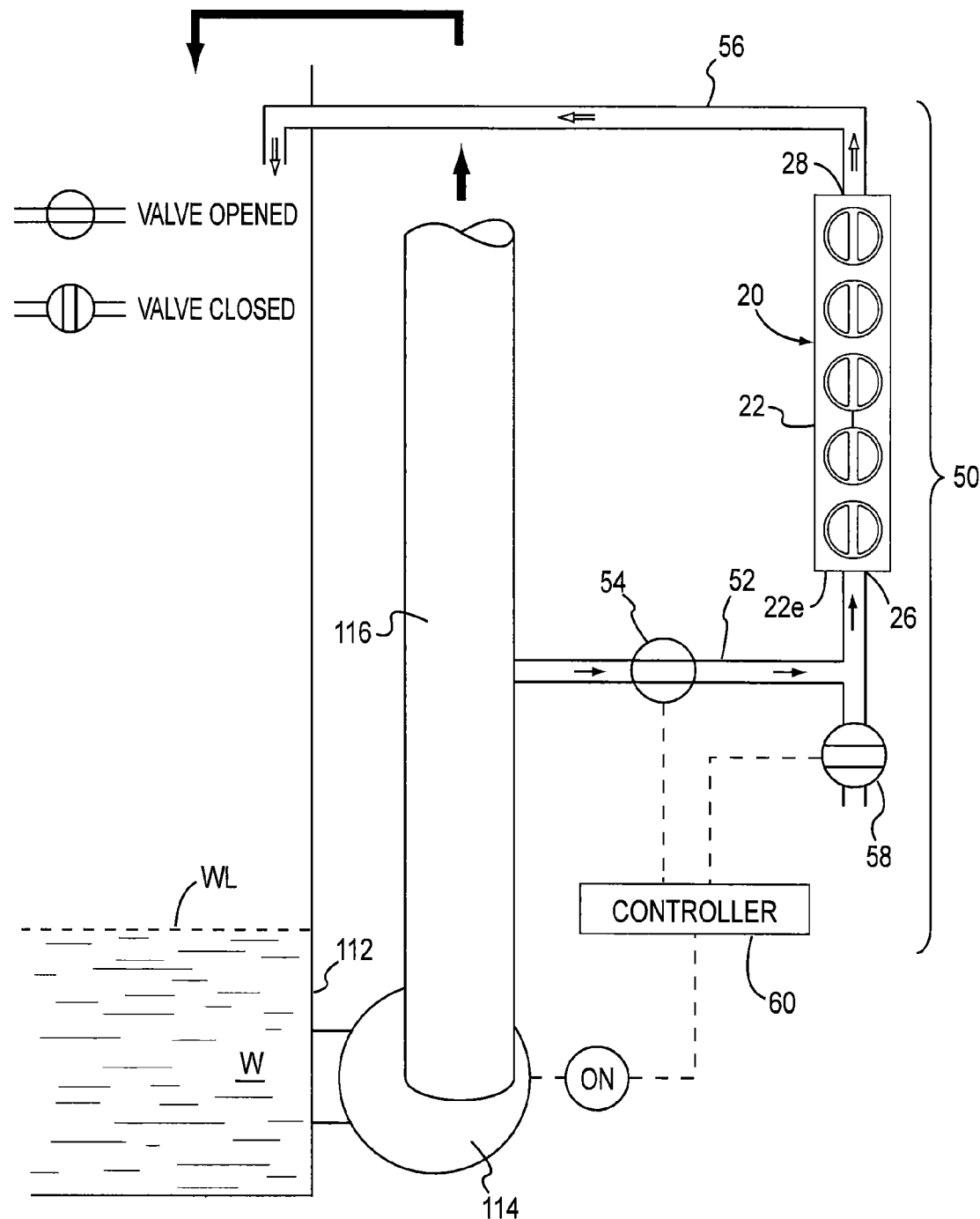
FIG. 13 is an enlarged partial view of the water treatment feeder system adapted to the conventional water re-circulating structure in a form of a heat exchanger shown in FIG. 1 with a pump in an ON condition, a water inlet valve in an OPENED state and a water drainage valve in a CLOSED state.

In FIG. 13, when the pump 114 is energized, a portion of the water W (represented by the small arrow in FIG. 13) flowing downstream of the pump 114 is directed to the inlet opening 26 of the magazine body 22 to fill the magazine body 22 with water W and thereafter to the outlet opening 28 of the magazine body 22 for the water W to flow out of the magazine body 22 so that the water W, now infused with the at least one water treatment chemical and represented by the double-line arrow, flows through the magazine body 22 and subsequently discharges into the water basin 114. Furthermore, upon contact with the water W, the first container 14 dissolves thereby exposing the water treatment pellets 12 to the water W in the magazine body 22 through the second container 16 and the selected one of the porous holders 32. In turn, the water now in contact with treatment pellets 12 causes the at least one water treatment chemical to leach from the water treatment pellets 12 and infuse the water W with the at least one water treatment chemical (represented by the double-line arrow) to produce a chemically-treated water that flows back into the water basin 112 to mix with the water W therein.

Figure 14:
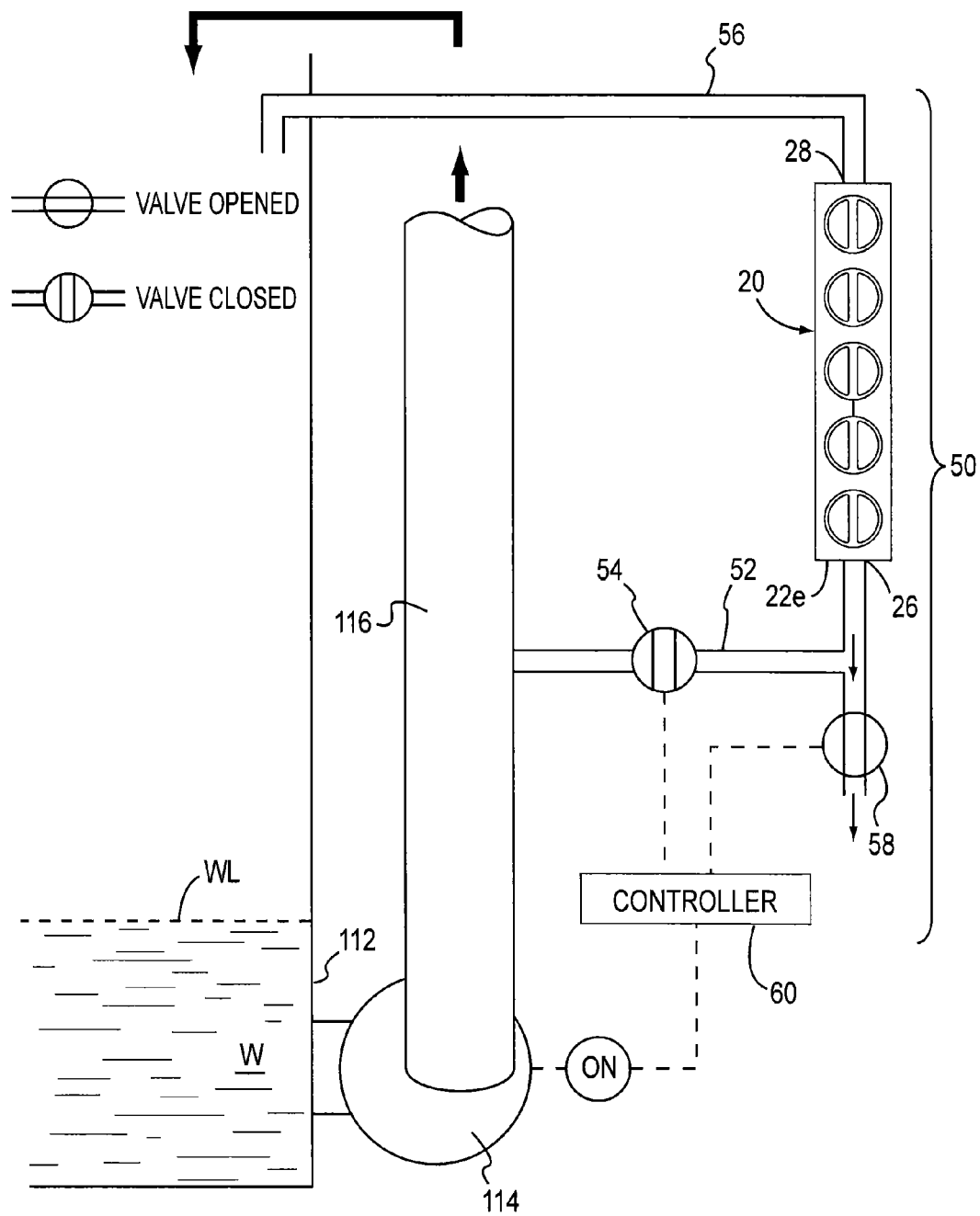
FIG. 14 is an enlarged partial view of the water treatment feeder system adapted to the conventional water re-circulating structure in a form of a heat exchanger shown in FIG. 1 with the pump in an ON condition, the water inlet valve in the CLOSED state and a water drainage valve in the OPENED state.
Figure 15:
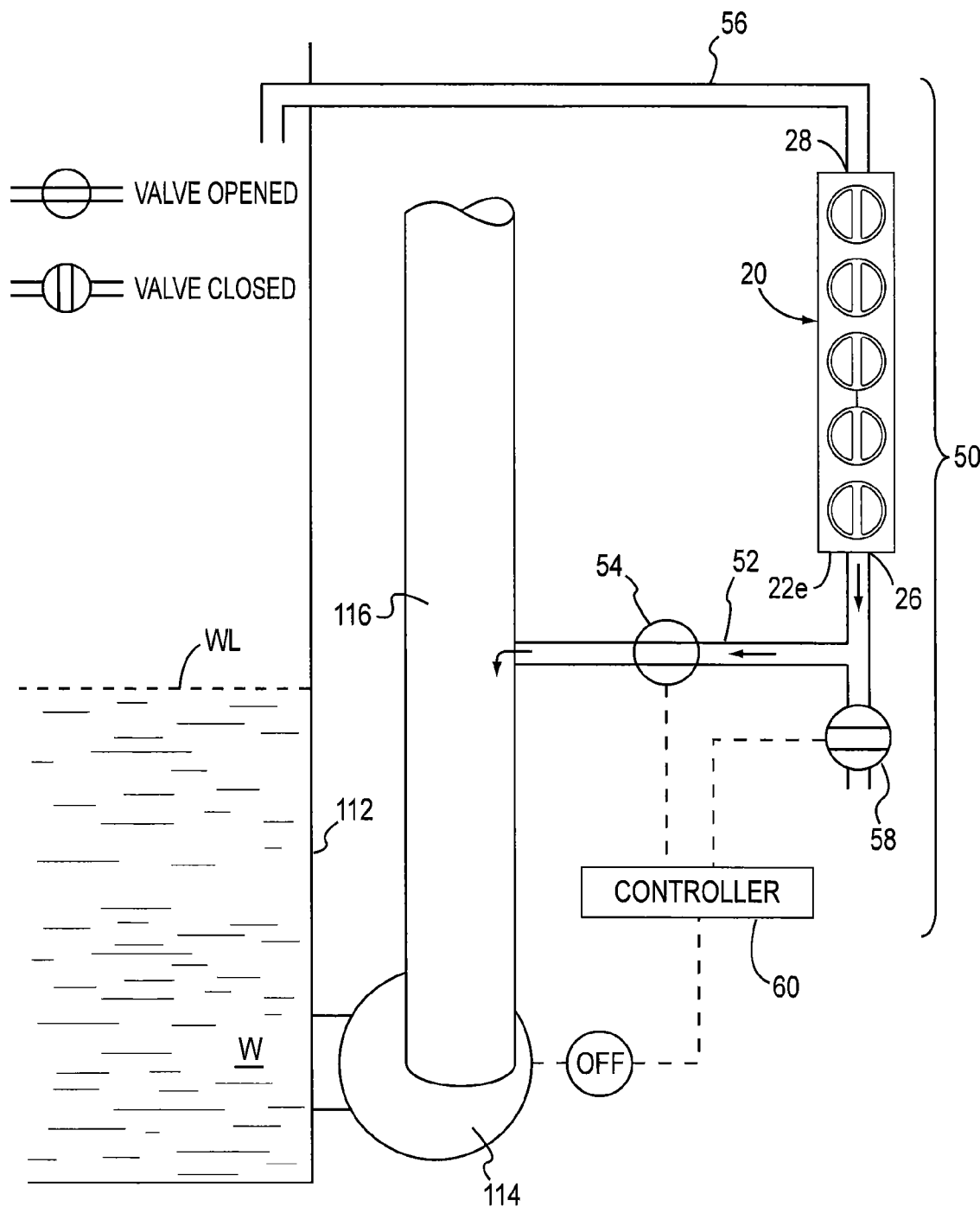
FIG. 15 is an enlarged partial view of the water treatment feeder system adapted to the conventional water re-circulating structure in a form of a heat exchanger shown in FIG. 1 with the pump in an OFF condition, the water inlet valve in an OPENED state and the water drainage valve in a CLOSED state.

Further, in FIGS. 13-15, the water treatment feeder system 50 includes water inlet piping 52 and a water inlet valve 54 interposed in the water inlet piping 52. The water inlet piping 52 directs the portion of water W (represented by the small arrow in FIG. 13) to flow downstream of the pump 114 to the inlet opening 26 in the magazine body 22. The water treatment feeder system 50 also includes water outlet piping 56. The water outlet piping 56 is connected at the outlet opening 28 of the magazine body 22 so that the water W can flow out of the magazine body 22 and discharge into the water basin 112. The water treatment feeder system 50 also includes a water drainage valve 58 interposed in the water inlet piping 56 and in fluid communication between the water inlet valve 54 and the inlet opening 26 in the magazine body 22. Note in FIGS. 13-15, the bottom wall 22e of the magazine body 22 is positioned above the water level WL. In this way, water W contained in the magazine body 22 is able to drain therefrom as discussed below.

Also, the water treatment feeder system 50 includes a controller 60. The controller 60 controls the water treatment feeder system 50 by opening the water inlet valve 54 and the water drainage valve 58 in an OPENED state and by closing the water inlet valve 54 and the water drainage valve 58 in a CLOSED state. In FIG. 13, when the pump 114 is in the ON condition, the water inlet valve 54 is the OPENED state and the water drainage valve 58 is in the CLOSED state, water W flows through the magazine body 22 to infuse the water W flowing therethrough with the at least one water treatment chemical. In FIG. 14, when the pump 114 is in the ON condition, the water inlet valve 54 is in the CLOSED state and the water drainage valve 58 is in the OPENED state, water W drains from the magazine body 22. The drained water W can drain exteriorly of the water basin 112 or it can be piped to return to the water basin 112. In this arrangement, the spent packages 10 of the water treatment pellets 12 can be removed from the magazine body 22 and packages 10 of the chemically-laden water treatment pellets 12 can be inserted into the magazine body while the structure is operating. The drainage valve 58 is opened to first drain the magazine body 22. In FIG. 15, when the pump 114 is in the OFF condition, the water inlet valve 54 is in the OPENED state and the water drainage valve 58 is in the CLOSED state, water W in the magazine body 22 drains therefrom and towards the water basin 112. With the bottom 26 of the magazine body 22 located above the water level WL, the magazine body 22 can be drained regardless if the structure is operating.

One of ordinary skill in the art would appreciate that the controller 60 can be, for example, an automatic controller that might employ a computer program. Alternatively, a skilled artisan would comprehend that the controller might be a human operator who manually causes the water inlet valve and the water drainage valve to be in either the OPENED state or the CLOSED state.

The present invention, may, however, be embodied in various different forms and should not be construed as limited to the exemplary embodiments set forth herein; rather, these exemplary embodiments are provided so that this disclosure will be thorough and complete and will fully convey the scope of the present invention to those skilled in the art.

What is claimed is:

1. A water treatment feeder device, comprising:
    a hollow, box-shaped magazine body having a front wall, a rear wall facially opposing and disposed apart from the front wall, a pair of side walls disposed apart from one another and connected to and between the front wall and the rear wall, a top wall and a bottom wall facially opposing and disposed apart from the top wall, the top wall and the bottom wall connected to the front wall, the rear wall and the pair of side walls to define a generally box-shaped internal magazine chamber, the bottom wall having an inlet opening formed therethough, the top wall having an outlet opening formed therethrough and the front wall having a plurality of ports formed therethrough; and
    a plurality of porous holders disposed in the internal magazine chamber, spanning between the front wall and the rear wall and secured therein such that a respective one of the plurality of porous holders corresponds to and generally aligns with a respective one of the plurality of ports.

2. A water treatment feeder device according to claim 1, wherein the plurality of ports are vertically aligned in series one on top of the other.

3. A water treatment feeder device according to claim 1, wherein further comprising a plurality of cap-receiving ring members, respective ones of the cap-receiving ring members being inserted into respective ones of the plurality of ports and connected to the front wall.

4. A water treatment feeder device according to claim 3, wherein each one of the plurality of cap-receiving ring members has a first ring member portion having a circumferential inner threaded portion defining a first ring member opening extending therethrough and a second ring member portion integrally and concentrically connected to the first ring member portion having a circumferential portion defining a second ring member opening and
    wherein respective ones of the porous holders and respective ones of the plurality of cap-receiving ring members are arranged relative to each other such that the respective ones of the cap-receiving ring members via the first ring member opening and the second ring member opening provide entry into respective ones of the elongated holder chambers.

5. A water treatment feeder system for a structure operative to circulate water thereabout, the structure including a water basin containing the water at a water level, circulation piping, a pump interposed in the circulation piping for pumping the water from the water basin and circulating the water back to the water basin, the water treatment feeder system comprising:
    a water treatment feeder device disposed downstream of the pump and including:
        a hollow, box-shaped magazine body having a front wall, a rear wall facially opposing and disposed apart from the front wall, a pair of side walls disposed apart from one another and connected to and between the front wall and the rear wall, a top wall and a bottom wall facially opposing and disposed apart from the top wall, the top wall and the bottom wall connected to the front wall, the rear wall and the pair of side walls to define a generally box-shaped internal magazine chamber, the bottom wall having an inlet opening formed therethough, the top wall having an outlet opening formed therethrough and the front wall having a plurality of ports formed therethrough; and
        a plurality of porous holders disposed in the internal magazine chamber, spanning between the front wall and the rear wall and secured therein such that a respective one of the plurality of porous holders corresponds to and generally aligns with a respective one of the plurality of ports; and at least one package of water treatment pellets laced with at least one water treatment chemical and disposed in the magazine body in a water-sealed manner and in a selected one of the plurality of porous holders, the at least one package of water treatment pellets including:
- a first container fabricated from a water-dissolvable sheet material, the first container being filled with and encasing the water treatment pellets; and
- a second container fabricated from a porous material, the second container sized and adapted to receive the first container filled with and encasing the water treatment pellets, wherein, when the pump is energized, a portion of the water flowing downstream of the pump is directed to the inlet opening of the magazine body to fill the magazine body with water and thereafter to the outlet opening of the magazine body for the water to flow out of the magazine body so that the water flowing through the magazine body subsequently discharges into the water basin and wherein, upon contact with the water, the first container dissolves thereby exposing the water treatment pellets to the water in the magazine body through the second container and the selected one of the porous holders, which, in turn, causes the at least one water treatment chemical to leach from the water treatment pellets and infuse the water with the at least one water treatment chemical to produce a chemically-treated water.

6. A water treatment feeder system according to claim 5, wherein the bottom wall of the magazine body is positioned above the water level.

7. A water treatment feeder system according to claim 6, further comprising water inlet piping and a water inlet valve inlet valve interposed in the water inlet piping, the water inlet piping directs the portion of water flowing downstream of the pump to the inlet opening in the magazine body.

8. A water treatment feeder system according to claim 7, further comprising water outlet piping, the water outlet piping being connected to the outlet opening of the magazine body so that the water can flow out of the magazine body and discharge into the water basin.

9. A water treatment feeder system according to claim 8, further comprising a water drainage valve interposed in the water inlet piping and in fluid communication between the water inlet valve and the inlet opening in the magazine body.

10. A water treatment feeder system according to claim 9, further comprising a controller for controlling the water treatment feeder system by energizing the pump in an ON condition or de-energizing the pump in an OFF condition, by opening the water inlet valve and the water drainage valve in an OPENED state and by closing the water inlet valve and the water drainage valve in a CLOSED state such that:
- when the pump is in the ON condition, the water inlet valve is the OPENED state the water drainage valve is in the CLOSED state, water flows through the magazine body to infuse the water flowing therethrough with the at least one water treatment chemical,
- when the pump is in the ON condition, the water inlet valve is in the CLOSED state and the water drainage valve is in the OPENED state, water drains from the magazine body, and
- when the pump is in the OFF condition, the water inlet valve is in the OPENED state and the water drainage valve is in the CLOSED state, water in the magazine body drains therefrom and towards the water basin.

\* \* \* \* \*